(12) United States Patent
Petersen et al.

(10) Patent No.: US 8,447,288 B2
(45) Date of Patent: May 21, 2013

(54) METHOD AND APPARATUS FOR DYNAMICALLY UPDATING AN ADDRESS BOOK WHEN A MOBILE DEVICE ROAMS FROM ONE NETWORK TO ANOTHER

(75) Inventors: Georg Lund Petersen, Roskilde (DK); Peter Josephsen, Glostrup (DK)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/114,526

(22) Filed: May 24, 2011

(65) Prior Publication Data
US 2012/0302216 A1 Nov. 29, 2012

(51) Int. Cl.
*H04M 3/00* (2006.01)

(52) U.S. Cl.
USPC .... 455/418; 455/432.1; 455/433; 379/142.15

(58) Field of Classification Search
USPC .............. 455/418, 432.1, 433; 379/142.15
See application file for complete search history.

(56) References Cited

U.S. PATENT DOCUMENTS

| 6,687,362 B1 * | 2/2004 | Lindquist et al. ........ 379/218.01 |
| 7,853,560 B1 | 12/2010 | Sivalingham et al. |
| 7,886,009 B2 | 2/2011 | Faber et al. |
| 2009/0147771 A1 * | 6/2009 | Seal et al. ...................... 370/352 |
| 2009/0249323 A1 * | 10/2009 | Nixon et al. .................. 717/173 |
| 2010/0040215 A1 * | 2/2010 | Gupta et al. ............. 379/142.07 |
| 2010/0158225 A1 * | 6/2010 | Rogers ..................... 379/142.06 |
| 2010/0158226 A1 * | 6/2010 | Arsenault et al. ........ 379/142.15 |
| 2010/0167694 A1 * | 7/2010 | Chiussi et al. ................ 455/411 |

FOREIGN PATENT DOCUMENTS

WO 2007067075 A2 6/2007

* cited by examiner

*Primary Examiner* — Danh Le

(57) ABSTRACT

A method and apparatus is disclosed for dynamically switching an operating address book upon registering a migrating radio with a visited network. Prior to migrating, the radio uses a first address book in a home network to identify calling radios in the home network, wherein the first address book includes information associated with radios in the home network. Upon roaming to a visited network, the radio registers with the visited network and the radio retrieves an additional network specific address book for the visited network. The radio automatically switches to the additional network specific address book, upon registering with the visited network. Subsequent calls received by the radio are thereafter identified according to information stored in the additional network specific address book.

21 Claims, 4 Drawing Sheets

| 202 | 204 | 206 | 208 | 210 |
|---|---|---|---|---|
| TETRA NETWORK | NETWORK ID | DEVICE INFORMATION | DEVICE IDENTIFIER | CALLER INFORMATION |
| SYSTEM 140 | 1 | 110-1 | 0001 | BOB |
| SYSTEM 140 | 1 | 110-2 | 0002 | SUE |
| SYSTEM 140 | 1 | 110-3 | 0003 | JANE |
| SYSTEM 140 | 1 | 110-N | 0004 | WILLIAM |

*FIG. 2*

| 302 | 304 | 306 | 308 | 310 |
|---|---|---|---|---|
| TETRA NETWORK | NETWORK ID | DEVICE INFORMATION | DEVICE IDENTIFIER | CALLER INFORMATION |
| SYSTEM 142 | 2 | 112-1 | 0001 | SALLY |
| SYSTEM 142 | 2 | 112-2 | 0002 | SARAH |
| SYSTEM 142 | 2 | 112-3 | 0003 | MARY |
| SYSTEM 142 | 2 | 112-N | 0004 | TOM |

*FIG. 3*

| 402 | 404 | 406 | 408 | 410 |
|---|---|---|---|---|
| TETRA NETWORK | NETWORK ID | DEVICE INFORMATION | DEVICE IDENTIFIER | CALLER INFORMATION |
| SYSTEM 144 | 3 | 114-1 | 0001 | JOE |
| SYSTEM 144 | 3 | 114-2 | 0002 | JOHN |
| SYSTEM 144 | 3 | 114-3 | 0003 | TIM |
| SYSTEM 144 | 3 | 114-N | 0004 | RICK |

*FIG. 4*

| 502 | 504 | 506 | 508 | 510 |
|---|---|---|---|---|
| TETRA NETWORK | NETWORK ID | DEVICE INFORMATION | DEVICE IDENTIFIER | CALLER INFORMATION |
| SYSTEM 144 | 3 | 110 | 0005 | BOB |
| SYSTEM 144 | 3 | 114 | 0001 | JOE |
| SYSTEM 144 | 3 | 132 | 0002 | JOHN |
| SYSTEM 144 | 3 | 134 | 0003 | TIM |
| SYSTEM 144 | 3 | 136 | 0004 | RICK |

METHOD AND APPARATUS FOR DYNAMICALLY UPDATING AN ADDRESS BOOK WHEN A MOBILE DEVICE ROAMS FROM ONE NETWORK TO ANOTHER

FIELD OF THE DISCLOSURE

The present disclosure relates generally to updating address books associated with a mobile device and more particularly to dynamically switching an operating address book associated with the mobile device when the mobile device roams to from one network to another.

BACKGROUND

Terrestrial Trunk Radio (TETRA) is a global standard for radio communications on mobile communication devices, such as private/professional mobile radios (herein simply referred to as radios). Any TETRA standards or specifications referred to herein may be obtained by contacting ETSI at ETSI Secretariat, 650, Route des Lucioles, 06921 Sophia-Antipolis Cedex, FRANCE. Professional mobile radios include radios, other than mobile telephones, such as mobile radios, portable radios, and the like. A TETRA network coverage area is configured to include a predefined geographical area. Currently there are a large number of TETRA systems for private companies, as well as, TETRA systems for nation wide public service organizations. These systems are typically separate so that radios assigned to one system may only communicate with other radios in that system. For a radio to communicate in each TETRA system, the radio keeps track of a unique Individual Short Subscriber Identity (ISSI) assigned to each of the other radios in the specific system in which the radio operates. Each radio typically maintains an address book (herein referred to as a home address book), wherein device information in the home address book is associated with the corresponding radio ISSI. The address book is typically stored in digital format in a memory device and the address book may include information associated with each radio in the TETRA system. When a radio receives a call (a communication signal sent from another radio according to a communication protocol), the radio uses the calling radio's ISSI to retrieve information, such as contact information, associated with the calling radio from the home address book. In order to place a call to another radio, the calling radio also uses the home address book to find the ISSI associated with the radio to be called. It should be noted that the home address book may also include the Individual TETRA Subscriber Identity (ITSI) to be used instead of the ISSI.

Selected radios may be able to migrate between separate TETRA systems, which means that they are allowed to roam between separate TETRA systems, for example to cooperate with other radios in border areas. The ISSI of a selected radio (a migrating radio that is allowed to migrate from a home TETRA system to a visited TETRA system) may be coordinated with the ISSIs assigned to radios in the visited TETRA system so that the ISSI for the migrating radio remains unique to the migrating radio in the visited TETRA system as well as in the home TETRA system. However, because ISSIs assigned to other radios in the visited and home TETRA systems are only coordinated based on the ISSI for the migrating radio, the same ISSI may be used by a non-migrating radio in the home TETRA system and another non-migrating radio in the visited TETRA system. Accordingly, when the migrating radio receives a call from a radio in the visited TETRA system, if the calling radio in the visited TETRA system is assigned the same ISSI as another radio in the home TETRA system, the migrating radio will use that ISSI to retrieve a caller identifier (ID) for the calling radio from its home address book. Because the migrating radio's address book is associated with radios in its home TETRA system, the migrating radio will erroneously display or otherwise present the contact information associated with the radio in its home system, rather than the contact information associated with the radio in the visited TETRA system. Similarly, when two radios are assigned the same ISSI, the migrating radio may erroneously direct a call to the wrong radio.

Users are typically grouped into logical talk groups to facilitate group discussion where users on different radios cooperate. In some situations, it may be essential for a group participant to join a group call. In TETRA systems, each group is assigned a Group Short Subscriber Identity (GSSI) or a Group TETRA Subscriber Identity (GTSI). According to the TETRA standards, groups may be group-linked. For example, a group five (5) in the home TETRA system may be linked to a group ten (10) in the visited TETRA system. When the migrating radio migrates to the visited TETRA system, the migrating radio remains linked to the group in its home TETRA system. The migrating radio is not configured to automatically link to the correct group in the visited TETRA system.

Accordingly, there is a need for a method and apparatus for enabling a migrating radio to dynamically switch its operating address book upon roaming to a visited TETRA system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 is a table that shows information relating to each radio in a TETRA system in accordance with some embodiments.

FIG. 3 is another table that shows information relating to each radio in another TETRA system in accordance with some embodiments.

FIG. 4 is another table that shows information relating to each radio in another TETRA system in accordance with some embodiments.

Figure 1:
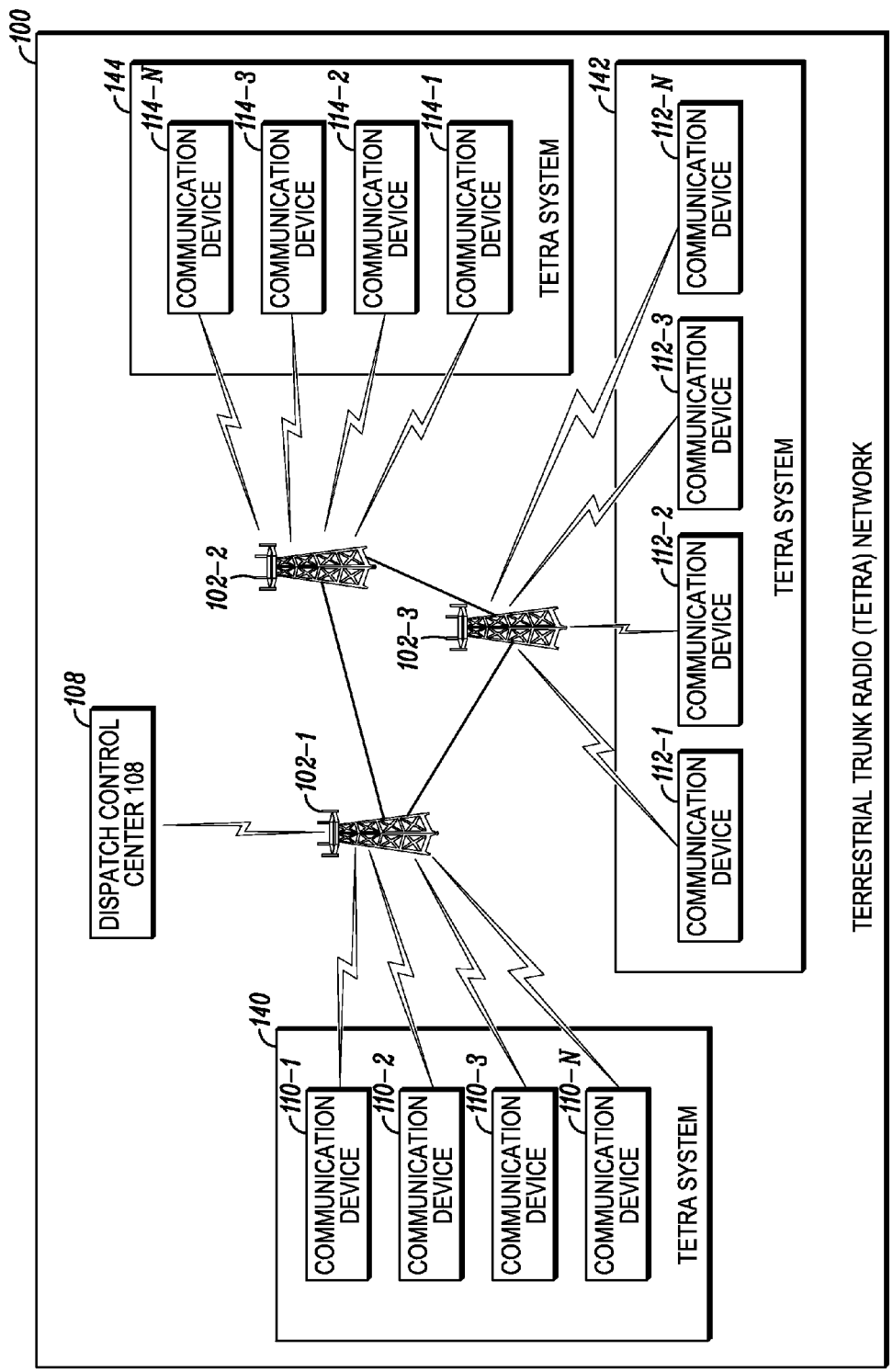
FIG. 1 is a block diagram of a Terrestrial Trunk Radio (TETRA) network with a plurality of TETRA systems in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for dynamically switching an operating address book upon registering a migrating radio with a visited network. Prior to migrating, the radio uses a first address book in a home network to identify calling radios in the home network, wherein the first address book includes information associated with radios in the home network. Upon roaming to a visited network, the radio registers with the visited network and retrieves an additional network specific address book for the visited network. The radio automatically switches to the additional network specific address book after registering with the visited network. Subsequent calls received by the radio are thereafter identified according to device information stored in the additional network specific address book.

FIG. 1 is a block diagram of a Terrestrial Trunk Radio (TETRA) network 100 with a plurality of TETRA systems 140, 142, 144 in accordance with some embodiments. Each of TETRA systems 140, 142, 144 includes communication devices (110-1-110-N (also referred to as 110), 112-1-112-N (also referred to as 112), 114-1-114-N (also referred to as 114). Communication devices 110, 112 and 114 may be, for example, private/professional mobile radios (personal or vehicular) configured to operate in trunked mode (TMO) and/or direct mode (DMO). When in trunked mode, communication devices (110, 112, 114) communicate with each other and/or with a central network component, such as a dispatch control center 108, by transmitting and receiving voice/data traffic and control/signaling streams through network infrastructure devices, such as base stations (102-1-102-3). When in direct mode, central network components, such as dispatch control center 108, and communication devices (110, 112, 114) communicate directly with each other.

TETRA systems 140, 142, 144 are typically separate so communication devices (also referred to herein as radios) assigned to one system may communicate with other radios in that system without interfering with radios in another system. Accordingly, in TETRA system 140, radios (110-1-110-N) communicate with each other; in TETRA system 142, radios (112-1-112-N) communicate with each other; and in TETRA system 144, radios (114-1-114-N) communicate with each other. For radios to communicate in each TETRA system 140, 142, 144, radios in each of TETRA system 140, 142, 144 keep track of a unique Individual Short Subscriber Identity (ISSI) or Individual TETRA Subscriber Identity (ITSI) assigned to each radio in the TETRA system. Nevertheless, one or more radios, for example radios 110-1, 112-1 and 114-1, are configured to migrate between TETRA systems 140, 142, 144.

In order to keep track of the ISSIs or ITSIs used in each TETRA system, information indicating the ISSIs or ITSI for each radio in a TETRA system may be stored in a database that is either stored in a memory of each radio or on an external device that is communicatively coupled to the radio. FIG. 2 is a table that shows examples of information related to each radio in TETRA system 140; FIG. 3 is a table that shows examples of information related to each radio in TETRA system 142; and FIG. 4 is a table that shows examples of information related to each radio in TETRA system 144. Each row in FIGS. 2, 3 and 4 is associated with a specific radio in the respective TETRA system. In an embodiment, each row in FIGS. 2, 3 and 4 includes a column (202, 302 or 402) that identifies the TETRA system to which a radio belongs, a column (204, 304 or 404) that identifies a TETRA system/network identifier (ID) for the TETRA system in which the radio operates, a column (206, 306 or 406) that identifies device information for the radio, a column (208, 308 or 408) that includes further identifying information such as an ISSI or ITSI for the radio, and a column (210, 310 or 410) that identifies caller identification information, such as a name or other identifying information, that is stored in a typical address book. Therefore, the rows of FIG. 2 are respectively associated with radios 110-1-110-N in TETRA system 140, the rows of FIG. 3 are respectively associated with radios 112-1-112-N of TETRA system 142, and the rows of FIG. 4 are respectively associated with radios 114-1-114-N of TETRA system 144. It should be appreciated by one of ordinary skill in the art that the information shown in FIGS. 2, 3, and 4 are only examples of information that may be stored for each radio.

When taken together, TETRA systems 140, 142, 144 may have overlapping radio identities (ISSIs or ITSIs) and overlapping group identities, such as Group Short Subscriber Identity (GSSI) or a Group TETRA Subscriber Identity (GTSI) for talk groups set up in each system. For example, in FIG. 2, 3, and 4 radios 110-2, 112-2 and 114-2 are each assigned an ISSI of "0002", radios 110-3, 112-3 and 114-3 are each assigned an ISSI of "0003" and radios 110-4, 112-4 and 114-4 are each assigned an ISSI of "0004". Using the information provided in FIGS. 2, 3 and 4, when radio 110-1 is in its home TETRA system 140 and radio 110-1 receives a call from radio 110-2, which is assigned the ISSI of "0002", radio 110 will display caller information for radio 110-2 to provide notification that radio 110-2 is calling (i.e. attempting to communicate) radio 110-1. Therefore, using the information in FIG. 2, as an example, radio 110-1 will display that "Sue" is calling.

As previously noted one or more radios, for example 110-1, 112-1 and 114-1, are configured to migrate between TETRA systems 140, 142, 144. For example, when radio 110-1 migrates to TETRA system 144 and radio 110-1 receives a call from radio 114-2, which is also assigned the ISSI of "0002", radio 110 will need to be able to accurately identify the calling radio as radio 114-2 instead of radio 110-2. Similarly, if radio 110-1 attempts make a call to a radio assigned the ISSI of "0002", radio 110-1 should be able to properly direct the call to either radio 110-2 or radio 114-2, depending on whether radio 110-1 is in TETRA system 140 or TETRA system 144. Accordingly, in addition to a home address book that is used by radio 110-1 when it is in its home network, radio 110 is configured to access an additional network specific address book upon migrating to a visited TETRA system. The additional network specific address book may be stored in a memory module on each migrating radio, prior to migration to another network, or the additional network specific address book may be stored on an external memory component communicatively coupled to the migrating radio.

In an embodiment, when radio 110 migrates from TETRA systems 140 to TETRA system 144, the radio will automatically start using the additional network specific address book for visited TETRA system 144. In some embodiments, the additional network specific address book is coordinated between the home system and the visited TETRA system and the network specific address book may be configured to include the unique ISSI assigned to the migrating radio plus other unique ISSIs that are planned (coordinated) between the TETRA systems. For example, when radio 110-1 migrates from TETRA system 140 to TETRA system 144, radio 110-1 is configured to automatically start using the additional network specific address book for TETRA system 144 which is coordinated between TETRA systems 140 and 144.

According to existing TETRA standards, a radio is informed about the identity of the network or TETRA system it migrates to. For example, when radio 110-1 migrates to TETRA system 144, radio 110-1 registers with TETRA system 144 and radio 110-1 is provided with the identity of TETRA system 144. Upon registering with TETRA system 144 and receiving an identifier for TETRA system 144, radio 110-1 uses the identifier for TETRA system 144 as a trigger to automatically switch to the additional network specific address book for the visited TETRA system. In some embodiments, upon registering with TETRA system 144 and receiving an identifier for TETRA system 144, radio 110-1 uses the identifier for TETRA system 144 as a trigger to automatically request the additional network specific address book for TETRA system 144 and to begin using the additional network specific address book for TETRA system 144 immediately upon receipt. According to some embodiments, the additional network specific address book for a visited system may be dynamically configured by the home TETRA system and the visited TETRA system when the additional network specific address book is requested by the migrating radio. According to other embodiments, the additional network specific address book for the visited system may be pre-configured by the home TETRA system and the visited TETRA system prior to being requested by the migrating radio. In any event, the additional network specific address book is configured to include unique ISSIs for radios in the visited TETRA system and migrating radios. The additional network specific address book for TETRA system 144 is therefore configured to include a unique ISSI for radio 110-1 (the radios which migrates) and unique ISSIs for other radios, as coordinated between the home and visited TETRA systems. The migrating radio thereafter uses the additional network specific address book for TETRA system 144 until the migrating radio registers with either its home network or another visited network. A call from a radio whose ISSI is not in the additional network specific address book will be displayed as 'unknown' on the migrating radio.

Figures 5, 6:
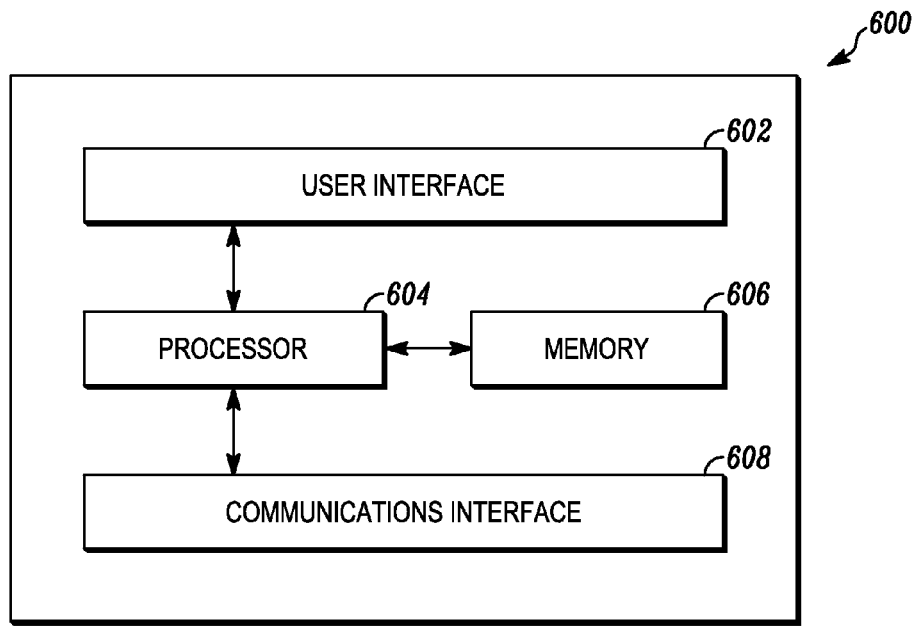
FIG. 5 is a table that shows an embodiment of a network specific address book to be used by a radio migrating from one TETRA system to another TETRA system in accordance with some embodiments.
FIG. 6 is a block diagram which illustrates components of a typical radio in accordance with some embodiments.

FIG. 5 is a table that shows an embodiment of an additional network specific address book that is used by a radio migrating from TETRA system 140 to TETRA system 144. Each row of FIG. 5 includes a column (502) that identifies the TETRA system to which a radio belongs, a column (504) that identifies a TETRA system/network identifier (ID) for the TETRA system in which the radio operates, a column (506) that identifies device information for the radio, a column (508) that includes further identifying information such as an ISSI or ITSI for the radio, and a column (510) that identifies caller identification information, such as a name or other identifying information that is stored in a typical address book. When migrating radio 110-1 registers with TETRA system 144 and receives the network identifier for TETRA system 144, radio 110-1 switches from using the information in its home address book (shown in FIG. 2) to using the information in the additional network specific address book (shown in FIG. 5). Thereafter, when radio 110-1 receives a call from another radio, it compares the network ID for the TETRA system being used by the calling radio and the ISSI of the calling radio with the information stored in the additional network specific address book for the TETRA system in which the radio is currently operating (in this case TETRA system 144). If the network ID for the TETRA system being used by the calling radio and the ISSI of the calling radio do not match a record in the currently used additional network specific address book, the calling radio is identified as 'unknown' on the migrating radio.

Using the information from FIG. 5, when radio 110—migrates from TETRA system 140 to TETRA system 144, radio 110 registers with TETRA system 144 and receives the network identifier (in this case 3) for TETRA system 144. Radio 110 switches from using the information associated with its home system (TETRA system 140) to using information in the additional network specific address book (shown in FIG. 5), as coordinated between TETRA systems 140 and 144. Thereafter, when radio 110-1 receives a call from radio 110-2, radio 110 compares the network ID and the ISSI assigned to radio 110-2 to information stored in the currently used additional network specific address book for TETRA system 144 (i.e., the information shown in FIG. 5). Because there is no record in FIG. 5 with a matching network ID and ISSI for radio 110-2, radio 110-1 identifies radio 110-2 as 'unknown'. If, however, radio 110-1 receives a call from radio 114-2, radio 110-1 will find a record in FIG. 5 with a matching network ID and ISSI for radio 114-2 and radio 110-1 is configured to display the caller information for radio 114-2 (in this case John). Therefore, radio 110 will not mistake a foreign or unknown radio (for example 110-2) for a radio from the visited network (in this case 114-2).

TETRA systems 140, 142, 144 may also include talk groups which have been group-linked. For example, two or more radios may be included in a talk group in TETRA system 140, where the talk group is assigned a GSSI or GTSI of "0010". The same talk group may be assigned a different GSSI or GTSI of "0100" in TETRA system 144. In an embodiment, the network specific address book for TETRA system 140 may also include group name, for example, "x-team" for the talk group assigned the GSSI of "0010" and the network specific address book for TETRA system 144 may include the same group name for the talk group assigned the GSSI of "0100". Accordingly, a migrating radio is automatically group linked to an appropriate group in the visited TETRA system. For example, when the radio roams from TETRA system 140 to TETRA system 144, the radio uses the linked talk group feature to select the talk group assigned the GSSI of "0100" and to automatically join the selected talk group when registering to the visited TETRA system, i.e., TETRA system 144.

FIG. 6 is a block diagram which illustrates components of a typical wireless radio, in accordance with some embodiments. According to an embodiment of the present invention the radio 600 includes a user interface 602 such as a keypad, display or touch sensor; a processor 604 to control operating features of the radio; a memory 606 to store, for example, data and computer program code components; and a wireless networking communication interface 608, which enables the radio to communicate wirelessly with other radios. The user interface 602, memory 606 and communication interface 608 are each operatively connected to the processor 604. Those skilled in the art will appreciate that the memory 602 may include various types of memory such as a random access memory (e.g., static random access memory (SRAM)), read only memory (e.g., programmable read only memory (PROM)), electrically erasable programmable read only memory (EPROM), or hybrid memory (e.g., FLASH), as is well known in the art. The processor 404 accesses a computer useable medium in the memory 602, which medium includes computer readable program code components configured to cause the radio to execute the functions described herein.

One or more modules of processor 604 may be configured to access the home address book in the home TETRA system, wherein the home address book includes information associated with radios in the home TETRA system; register with a visited TETRA system when the migrating radio roams from the home TETRA system to the visited TETRA system; retrieve an additional network specific address book for the visited TETRA system and automatically switch to the additional network specific address book upon registering the radio with the visited TETRA system; and to identify subsequent calls received by the radio according to information stored in the additional network specific address book.

Figure 7:
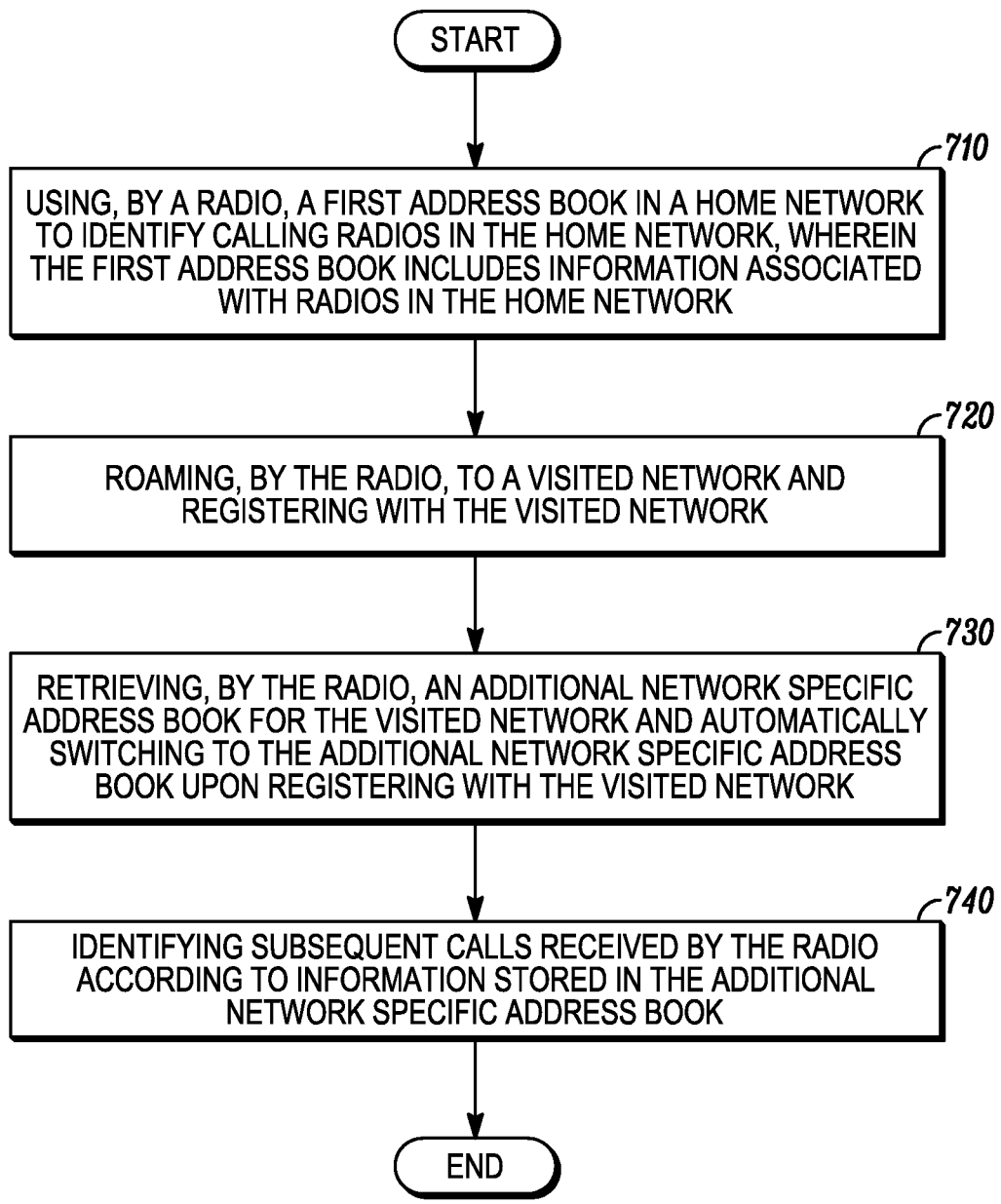
FIG. 7 is a flowchart of a method for dynamically switching to a network specific address book coordinated between a home TETRA system and a visited TETRA system when a radio migrates to the visited TETRA system in accordance with some embodiments.

FIG. 7 is a flowchart of a method for dynamically switching an operating address book upon registering a migrating radio with a visited network. In 710, using, by a radio, a first address book in a home network to identify calling radios in the home network, wherein the first address book includes information associated with radios in the home network. In 720, roaming, by the radio, to a visited network and registering with the visited network. In 730, retrieving, by the radio, an additional network specific address book for the visited network and automatically switching to the additional network specific address book upon registering with the visited network. In 740, identifying subsequent calls received by the radio according to information stored in the additional network specific address book.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, in a radio, for dynamically switching an operating address book upon registering with a visited network, the method comprising:

using, by a radio, a first address book in a home network to identify calling radios in the home network, wherein the first address book includes information associated with radios in the home network;

roaming, by the radio, to a visited network and registering with the visited network;

retrieving, by the radio, an additional network specific address book for the visited network and automatically switching to the additional network specific address book upon registering with the visited network; and identifying subsequent calls received by the radio according to information stored in the additional network specific address book.

2. The method of claim 1, wherein the registering comprises receiving an identifier for the visited network and using the identifier for the visited network as a trigger to retrieve the additional network specific address book and to automatically switch to the additional network specific address book.

3. The method of claim 1, wherein the identifying comprises comparing a network identifier for a network in which a calling radio operates and an identifier assigned to the calling radio with records in the additional network specific address book and presenting the calling radio as unknown if no match exists.

4. The method of claim 1, wherein the identifying comprises comparing a network identifier for a network in which a calling radio operates and an identifier assigned to the calling radio with records in the additional network specific address book and presenting information associated with the calling radio from the additional network specific address book if a match exists.

5. The method of claim 1, wherein the additional network specific address book is coordinated between the home network and the visited network prior to the radio roaming to the visited network.

6. The method of claim 5, wherein the additional network specific address book is coordinated to include the unique identifier assigned to the radio and other unique identifiers assigned to other radios in either the home network or the visited network.

7. The method of claim 5, wherein the additional network specific address book is coordinated to link a talk group in the home network with a talk group in the visited network.

8. The method of claim 7, further comprising using, by the radio, a link between the talk group in the home network and the talk group in the visited network to join the talk group in the visited network when the radio registers to the visited network.

9. The method of claim 1, further comprising storing the additional network specific address book in a memory on the radio, prior to the radio roaming to the visited network.

10. The method of claim 1, further comprising storing the additional network specific address book in an external memory communicative coupled to the radio, prior to the radio roaming to the visited network.

11. A radio configured to dynamically switch an operating address book upon registering with a visited network, the radio comprises:

a processing unit configured to access a first address book in a home network to identify calling radios in the home network, wherein the first address book includes information associated with radios in the home network;

a registration unit configured to register with a visited network upon roaming from the home network to the visited network;

a retrieving unit configured to retrieve an additional network specific address book for the visited network and to automatically switch to the additional network specific address book upon registering with the visited network; and an identifying unit configured to identify subsequent calls received by the radio according to information stored in the additional network specific address book.

12. The radio of claim 11, wherein the registration unit is configured to receive an identifier for the visited network and the retrieving unit is configured to use the identifier for the visited network as a trigger to retrieve the additional network specific address book and to automatically switch to the additional network specific address book.

13. The radio of claim 11, wherein the identifying unit is configured to compare a network identifier for a network in which a calling radio operates and an identifier assigned to the calling radio with records in the additional network specific address book and to present the calling radio as unknown if no match exists.

14. The radio of claim 11, wherein the identifying unit is configured to compare a network in which a calling radio operates and an identifier assigned to the calling radio with records in the additional network specific address book and to present information associated with the calling radio from the additional network specific address book if a match exists.

15. The radio of claim 11, wherein the additional network specific address book is coordinated between the home network and the visited network prior to the radio roaming to the visited network.

16. The radio of claim 15, wherein the additional network specific address book is coordinated to include the unique identifier assigned to the radio and other unique identifiers assigned to other radios in either the home network or the visited network.

17. The radio of claim 15, wherein the additional network specific address book is coordinated to link a talk group in the home network with a talk group in the visited network.

18. The radio of claim 11, further comprising a memory configured to store the additional network specific address book, prior to the radio roaming to the visited network.

19. The radio of claim 11, further comprising a unit for accessing an external memory on which the additional network specific address book is stored, prior to the radio roaming to the visited network.

20. The radio of claim 17, where a link between the talk group in the home network and the talk group in the visited network is used to join the radio to the talk group in the visited network when the radio registers to the visited network.

21. A computer-readable medium having stored thereon, computer executable instructions that, if executed by a processor, causes the processor to perform a method for dynamically switching an operating address book upon registering with a visited network, the method comprising:

using, by a radio, a first address book in a home network to identify calling radios in the home network, wherein the first address book includes information associated with radios in the home network;

roaming, by the radio, to a visited network and registering with the visited network;

retrieving, by the radio, an additional network specific address book for the visited network and automatically switching to the additional network specific address book upon registering with the visited network; and identifying subsequent calls received by the radio according to information stored in the additional network specific address book.

* * * * *